UNITED STATES PATENT OFFICE.

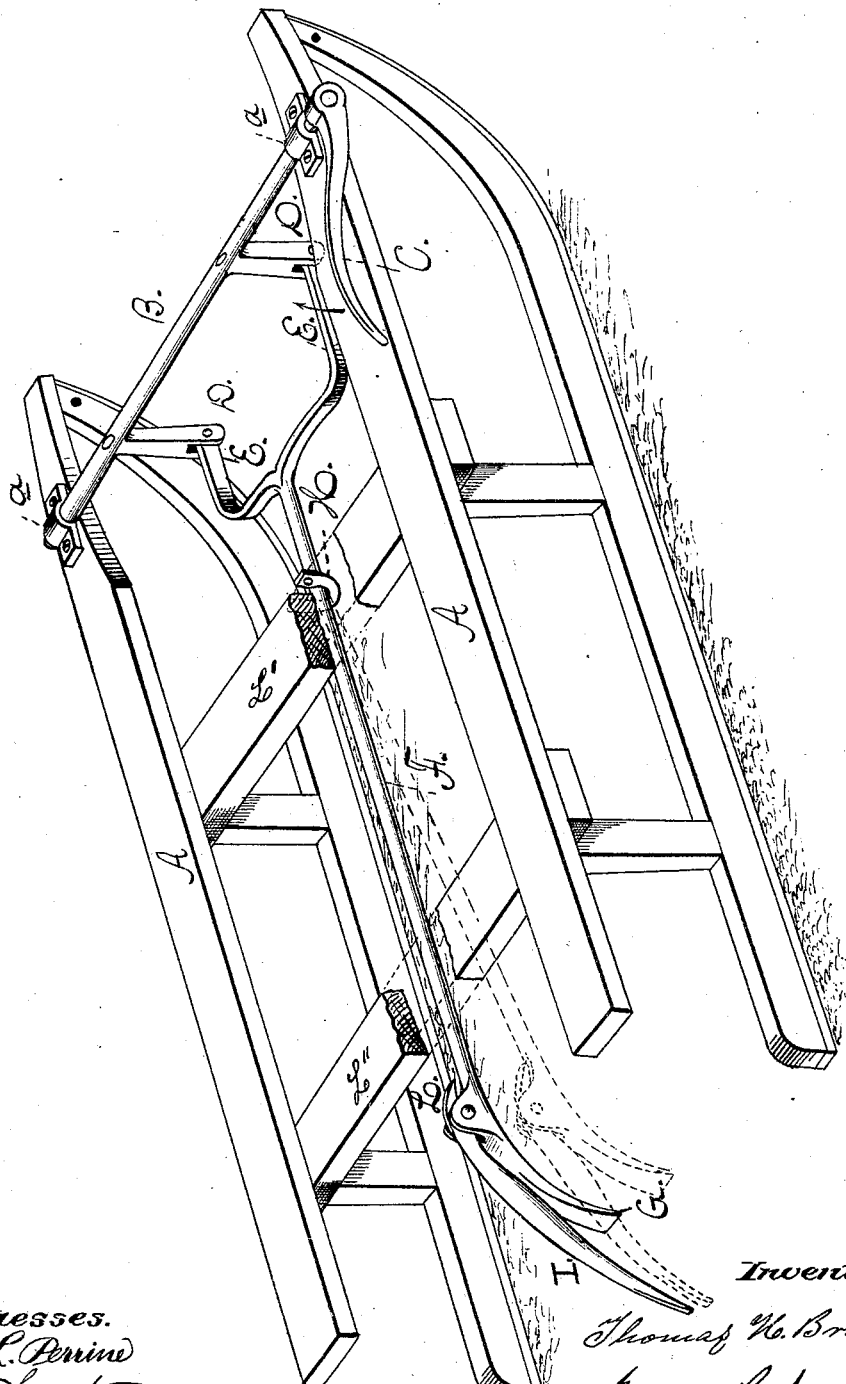

THOMAS H. BROMLEY, OF STONEBOROUGH, PENNSYLVANIA.

IMPROVEMENT IN SLEIGH-BRAKES.

Specification forming part of Letters Patent No. 144,949, dated November 25, 1873; application filed November 3, 1873.

*To all whom it may concern:*

Be it known that I, THOMAS H. BROMLEY, of Stoneborough, in the county of Mercer and State of Pennsylvania, have invented certain new and useful Improvements in Sled-Brakes, of which the following is a specification:

This invention has for its object to furnish a simple and effective brake for sleds; and to this end the invention consists in the provision of a sliding brake-bar formed with bifurcated arms at its forward end, which are pivoted to the pendent arms of a transverse rock-shaft, the latter being provided with a hand-lever for throwing the brake-bar in contact with the ground or up against the under side of the sled-body when not in use. The invention also consists in the employment of a pivoted claw or spur, which, in connection with a fixed claw at the lower end of the brake-bar, serves to secure a very strong hold on the ground, thus furnishing most effective means for arresting the movement of the sled when ascending or descending steep grades.

In the accompanying drawing the figure is a perspective view of a sleigh embodying my invention.

The body or frame of the sled is designated by the letter A, and at its forward end is located a transverse shaft, B, which is journaled in boxes or bearings *a a*, and is provided at its outer end with a hand-lever, C. D D are pendent arms attached to or formed with the shaft C, and provided with forked or slotted ends for the attachment of the bifurcated branches or arms E E of a longitudinally-sliding bar, F.

The arms E E referred to may be formed with the bar F, or they may be attached thereto by welding, or in any other suitable manner.

The rear extremity of the bar F is bent downward to form a claw or prong, G, which is projected into the ground to arrest the movement of the sled by turning the hand-lever from a horizontal to a vertical position, which causes the bar F to slide in a rearward and downward direction, its movement being guided and limited by passing it through a "keeper" or hanger, H, applied to the under side of one of the cross-beams of the sled, as shown.

The attachment of the brake-bar to the rock-shaft B by the lateral branches of said bar, insures a more perfect and stronger connection than if it were directly connected to the rock-shaft; and, furthermore, the force of the operator is more perfectly concentrated upon the brake-bar.

A single claw or hook does not offer the desired safety in ascending or descending steep grades, as the same may incidentally slip by not obtaining a proper hold of the ground; and to overcome these objections I have resource to a supplementary claw or prong, I, which is pivoted between ears K, formed on the upper surface of the brake-bar. Said prong or claw I is curved and pointed, and is made larger than the claw G, so that, when the rock-shaft is turned to operate the brake, it will be projected into the ground or ice in rear of the claw G, thus obtaining a double purchase or hold on the ground, which effectually serves to arrest the movement of the sled, obviating, therefore, all danger to life or injury to the sled.

It will be perceived that the end of the movable claw is extended in rear of its pivoted connection, as shown at L, thus preventing the same from being thrown upward when projected into the ground, as said extended portion serves as a stop by coming in contact with the brake-bar.

A brake mechanism constructed as above described offers every facility for arresting the sled to which it is applied, and withal it is also of a more durable and simple construction than the devices heretofore resorted to for the same purpose.

Instead of the arms E E terminating at a single point upon the brake-bar F in front of the cross-bar or beam of the sled, I will, in most instances, form the said arms so that each will have a bearing in eyes or loops arranged upon the cross-beam, and connect the same with the brake-bar F in the rear of said cross-beam, so as to secure a greater leverage and exert more direct power upon the brake-bar.

I claim as my invention—

1. The brake-bar F, having the claw G and branching arms E E, in combination with the pendent arms D D and rock-shaft B, as and for the purpose specified.

2. The prongs I, pivoted upon the brake-bar F having the prong G, combined substantially as described, for the purpose specified.

3. The combination of the prongs I, brake-bar F having prong G, rock-shaft B, and arms E D, substantially as described.

In testimony that I claim the foregoing I have hereunto set my hand this 17th day of October, 1873.

THOMAS H. BROMLEY.

Witnesses:
L. P. FUSTER,
M. L. ZALMISER.